(12) United States Patent
Husar et al.

(10) Patent No.: US 9,058,225 B2
(45) Date of Patent: Jun. 16, 2015

(54) SECURE AND RELIABLE MECHANISM TO PROVIDE A SINGLE OBJECT INSTANCE IN A CLUSTERED SYSTEM

(71) Applicant: Red Hat, Inc., Raleigh, NC (US)

(72) Inventors: Radoslav Husar, Brno (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 13/852,437

(22) Filed: Mar. 28, 2013

(65) Prior Publication Data

US 2014/0298325 A1     Oct. 2, 2014

(51) Int. Cl.
*G06F 13/00*     (2006.01)
*G06F 9/54*     (2006.01)
*G06F 9/455*     (2006.01)

(52) U.S. Cl.
CPC .............. *G06F 9/54* (2013.01); *G06F 9/45533* (2013.01)

(58) Field of Classification Search
CPC ..... G06F 9/45533; G06F 9/465; G06F 9/541; G06F 9/547
USPC ............................... 718/1; 719/316, 328, 330
See application file for complete search history.

(56) References Cited

U.S. PATENT DOCUMENTS

| | | | |
|---|---|---|---|
| 6,272,557 B1 | 8/2001 | Lim et al. | |
| 7,107,575 B1 | 9/2006 | Mor et al. | |
| 7,461,075 B2 * | 12/2008 | Claussen et al. | 1/1 |
| 7,543,301 B2 * | 6/2009 | Monnie et al. | 719/312 |
| 7,971,210 B2 | 6/2011 | Arthurs et al. | |
| 8,028,002 B2 | 9/2011 | Petev et al. | |
| 2004/0154027 A1 * | 8/2004 | Vandewalle et al. | 719/330 |
| 2005/0080837 A1 * | 4/2005 | Wieczorek et al. | 709/200 |
| 2007/0094676 A1 * | 4/2007 | Fresko et al. | 719/330 |
| 2008/0281866 A1 * | 11/2008 | Claussen et al. | 707/103 Y |
| 2011/0258639 A1 * | 10/2011 | Walsky et al. | 719/316 |
| 2012/0209909 A1 * | 8/2012 | Huang et al. | 709/204 |
| 2012/0317447 A1 | 12/2012 | Yildiz et al. | |
| 2013/0167157 A1 * | 6/2013 | Daumling et al. | 719/318 |

OTHER PUBLICATIONS

Martin Dias, Mariano Martinez Peck, Stephane Ducasse and Gabriela Arévalo; "Clustered Serialization With Fuel;" Aug. 16, 2011; pp. 1-13; RMoD Project-Team, Inria Lille-Nord Europe / Université de Lille I; Ecole des Mines de Douai; Universidad de Buenos Aires; Universidad Abierta Interamericana; CONICET.
Jonathan Appravoo, B.Sc., M.Sc.; "Clustered Objects," 2005; pp. 1-176; Thesis Submitted With the Requirements for the Degree of Doctor of Philosophy Graduate Department of Computer Science University of Toronto.

* cited by examiner

*Primary Examiner* — Andy Ho
(74) *Attorney, Agent, or Firm* — Haynes and Boone, LLP

(57) ABSTRACT

An example system for transmitting data between applications may include an access module that accesses a data object associated with a first application running on a first node. The access module may access the data object without using a class library. The system also includes a communication module that transmits via a network to a second node, data associated with the data object. The communication module may transmit the data for use by a second application running on the second node, and the data object may be accessible by at most one application at a time.

20 Claims, 5 Drawing Sheets

US 9,058,225 B2

SECURE AND RELIABLE MECHANISM TO PROVIDE A SINGLE OBJECT INSTANCE IN A CLUSTERED SYSTEM

BACKGROUND

A data object may be passed between applications by electronic means. A common technique to pass a data object includes object serialization. A serialized object may refer to an object represented as a sequence of bytes that includes the object's data as well as information about the object's type and the types of data stored in the object. Serialization may include writing an entire object to a stream, persisting the object, and/or sending the object over a network. Serialization enables object persistence because the stored object continues to serve a purpose even when the program is not running. Thus, a serialized object is capable of existing and functioning outside of the program that created it. An object may be serialized to disk on a single computer or may be serialized across a network such as the Internet.

After a serialized object has been, for example, written into a file or sent over a network, it can be deserialized. Deserialization may refer to reading or loading the object, and the type information and bytes that represent the object and its data may be used to recreate the object in memory.

BRIEF SUMMARY

This disclosure relates to transmitting data between applications. Methods, systems, and techniques for transmitting data between applications are provided.

According to an embodiment, a system for transmitting data between applications includes an access module that accesses a data object associated with a first application running on a first node. The access module accesses the data object without using a class library. The system also includes a communication module that transmits via a network to a second node, data associated with the data object. The communication module transmits the data for use by a second application running on the second node, and the data object is accessible by at most one application at a time.

According to another embodiment, a method of transmitting data between applications includes accessing a data object associated with a first application running on a first node. The data object is accessed without using a class library. The method also includes transmitting via a network to a second node, data associated with the data object. The data is transmitted for use by a second application running on the second node, and the data object is accessible by at most one application at a time.

According to another embodiment, a non-transitory machine-readable medium includes a plurality of machine-readable instructions that when executed by one or more processors are adapted to cause the one or more processors to perform a method including accessing a data object associated with a first application running on a first node, where the data object is accessed without using a class library; and transmitting via a network to a second node, data associated with the data object, where the data is transmitted for use by a second application running on the second node, and the data object is accessible by at most one application at a time.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Access Data Object
  B. Transmit Data Associated with Data Object
III. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Serializing an object creates a copy of the original data, and this might have a negative side effect when it comes to security. One might need to securely and reliably transfer some data (e.g. an existing valid authentication token) to another application. This disclosure provides a technique to securely and reliably pass data between applications.

In an embodiment, a first application instantiates a data object via a first node that the first application is running on. The first node may store the data object in memory. The data object associated with the first application may be accessed by the application without using a class library. The data associated with the data object may be transmitted via a network to a second node. The data may be transmitted for use by the second application running on the second node, and the data object is accessible by at most one application at a time.

II. Example System Architecture

Figure 1:
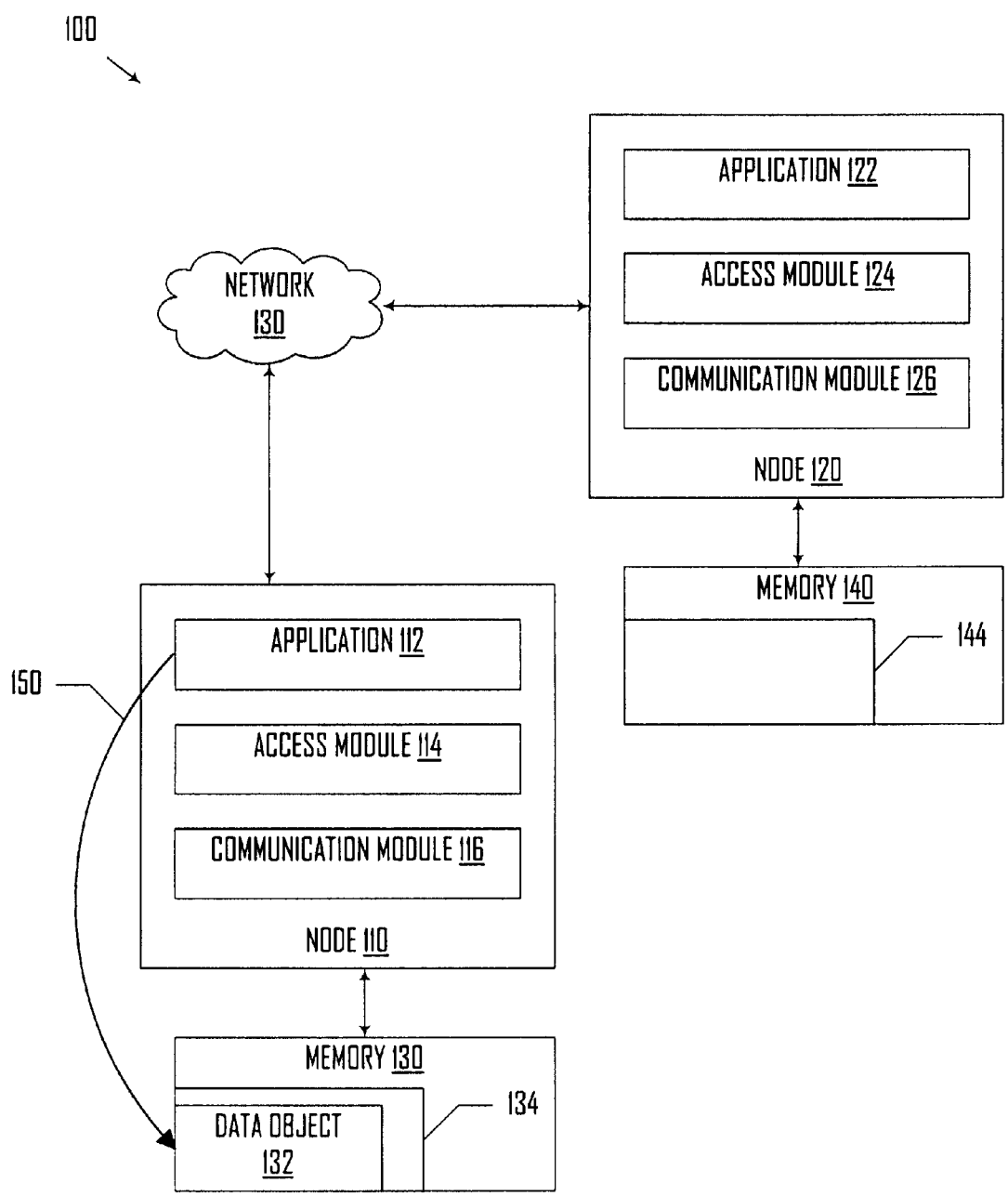
FIG. 1 is a simplified block diagram illustrating a system for transmitting data from a first application running on a first node to a second application running on a second node, according to an embodiment.

FIG. 1 is a simplified block diagram 100 illustrating a system for transmitting data from a first application running on a first node to a second application running on a second node, according to an embodiment.

Diagram 100 includes a node 110 and a node 120 coupled to a network 130. Each of node 110 and node 120 may be implemented on a computing device. In an example, nodes 110 and 120 are implemented on the same computing device. In another example, nodes 110 and 120 are implemented on different computing devices.

Node 110 and/or node 120 may be software programs that run and communicate with applications. For instance, node 110 and/or node 120 may be an operating system or a virtual machine running on a computing device. Each of node 110 and node 120 may communicate with each other via network 130.

Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A. Access Data Object

Node 110 is coupled to a memory 130 and runs an application 112. Node 110 includes an access module 114 and a communication module 116. Similarly, node 120 is coupled to a memory 140 and runs an application 122. Node 120 includes an access module 124 and a communication module 126.

The following is a description of node 110. This description applies as well to node 120. Node 110 may run an application 112 that is written in a high-level programming language. In an example, application 112 is written in an object-oriented programming language that defines classes. A data object may be a self-contained entity that has state and behavior and represents an instance of a class. The data object's state may be described as its fields and properties, and the data object's behavior may be described by its methods and events. Application 112 may include code that creates objects of a class, and an object of a particular class may expose methods and properties defined by that class. An application running on a node may instantiate a data object via the node.

In an embodiment, the data object is accessible by at most one application at a time, and the node running the application owns the data object. The node may own a data object if the application running on the node has permission to access the data object. The application may access the data object by reading or modifying the data object.

Node 110 is coupled to a memory 130 and includes an access module 114 and a communication module 116. Application 112 running on node 110 may instantiate a data object 132 via node 110, and node 110 may store data object 132 in memory 130. The node controls the application and may have access to the data objects instantiated by the application. Further, node 110 may own the data object and accordingly grant application 112 permission to access the data object. An arrow 150 is illustrated to show that node 110 owns data object 132, and application 112 has access to data object 132. Accordingly, application 112 may access data object 132 by reading or modifying the data object.

The first application may access the data object without using a class library. The class library is external to the node. In an example, the library includes a single class file. In an example, the library includes multiple class files. In another example, the first application is written in Java® and the library includes one or more Java® Archive (JAR) files.

In an example, a memory region 134 of memory 130 may be allocated to application 112, and node 110 may grant application 112 access to memory region 134. In an embodiment, memory region 134 is devoid of a class library that enables application 112 to access data object 132. In another embodiment, memory region 134 includes a class library that enables application 112 to access data object 132, but application 112 does not use the class library to access data object 132.

A programmer may write application 112 in a programming language that accesses the data object by using a class library associated with the programming language. The application may be, for example, a Java® application, C++ application, or Python application.

The class library may be a modular component of reusable code that provides the programmer with useful facilities. Application 112 may call the class library at runtime to, for example, access the data object or transfer the data object via a network to another node. Application 112 may be unable to access the data object or transfer the data object via the network without using the class library. In an example, the class library resides external to node 110. Because the class library resides external to node 110, such calls may have significant overhead.

In an embodiment, access module 114 accesses the data object associated with application 112 without accessing a class library. This may provide application 112 with quicker access to the data object compared to using a class library to access the data object. Further, this may incur less overhead. In an example, access module 114 invokes an application programming interface (API) to directly access the data object. Access module 114 may via the API invoke methods and access properties of data object 132. Node 110 may provide internal APIs that allow application 112 to directly access the data object.

In an example, node 110 is a virtual machine, and data object 132 is instantiated by the virtual machine. A virtual machine is a software implementation of a machine that may execute programs. In an example, node 110 is a JAVA® virtual machine, and a new keyword or interface is introduced, public APIs are available to allow developers to use this functionality, and an extension is provided to the JAVA® virtual machine. Trademarks are the property of their respective owners.

B. Transmit Data Associated with Data Object

Application 122 running on node 120 may also have use for data object 132. In an embodiment, communication module 116 transmits via network 130 to node 120, data associated with data object 132. Communication module 116 may transmit the data associated with data object 132 for use by application 122. It may be desirable to separate data object 132 and the data associated with data object 132. Node 120 may receive the data associated with data object 132. Communication module 116 may invoke an API to transmit to node 120 the data associated with data object 132.

Figure 2:
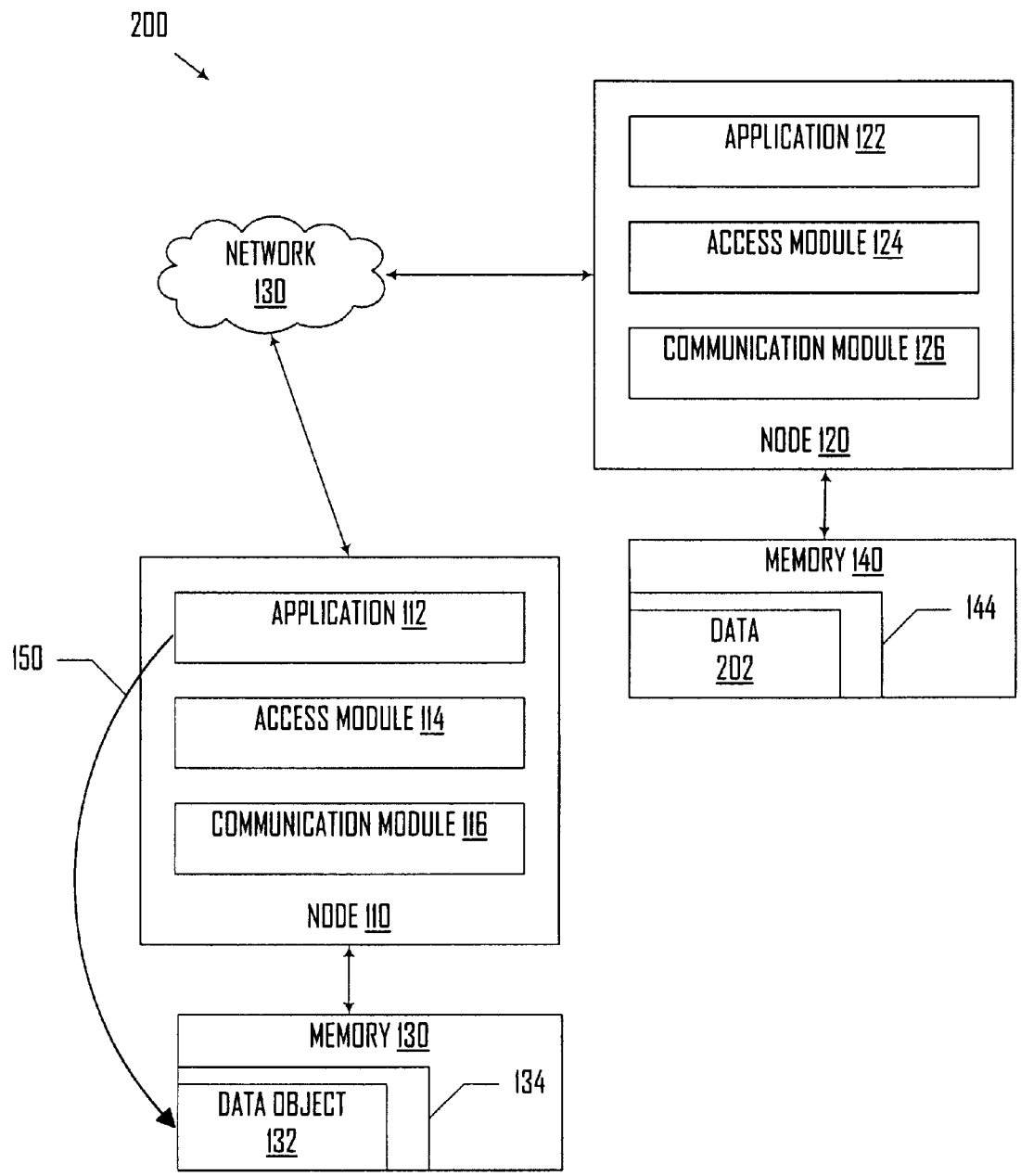
FIG. 2 is a simplified block diagram illustrating the first node sending to the second node data associated with the data object, according to an embodiment.

FIG. 2 is a simplified block diagram 200 illustrating node 110 sending to node 120 data associated with data object 132, according to an embodiment.

In FIG. 2, node 120 has received data 202. Data 202 is data associated with data object 132. The data associated with data object 132 may include one or more properties and one or more methods of the data object. When node 120 receives the data associated with data object 132, node 120 may store the data associated with data object 132 in a memory region 144 of memory 140. Memory 140 may be allocated to application 122.

Communication module 116 may transmit the data associated with data object 132 to node 120 to enable application 122 running on node 120 to access the data object. Communication module 116 may transmit the data to node 120 for a variety of reasons. In an example, node 110 is a server, and node 120 is a client that sends a request to the server for data object 132. In another example, communication module 116 may receive a remote method call from node 120 that causes communication module 116 to transmit the data associated with data object 132.

Access module 114 may wait to receive a communication from node 120 confirming receipt of the data associated with data object 132 before access module 114 deletes data object 132. In this way, the transfer of data associated with data object 132 may be reliable. This may prevent loss of data object 132 in case node 120 does not properly receive the data associated with data object 132. For example, if node 120 did not properly receive the data associated with data object 132, application 112 may still be able to access data object 132 and retransmit data object 132 to node 120. When the communication confirming receipt of the data associated with data object 132 has not been received after a time period has elapsed, communication module 116 may retransmit via network 130 to node 120, the data associated with data object 132.

This may additionally provide an advantage in terms of security because only one application is guaranteed to have access at a time to data object 132. Accordingly, only one application may modify data object 132 at a time. The fewer copies of data object 132 that exist, the less likely that data object 132 may be tampered with or improperly viewed. In an example, data object 132 may be an authentication token.

In an embodiment, data object 132 is accessible by at most one application at a time. Accordingly, when node 120 receives the data associated with data object 132, node 120 may prevent application 122 from accessing the data associated with data object 132 because node 110 still owns data object 132. In FIG. 2, arrow 150 is illustrated to show that node 110 still owns data object 132, and application 112 continues to have access to data object 132. If application 122 is prevented from accessing the data associated with data object 132, application 122 is unable to modify or read the data associated with data object 132.

After node 120 receives the data associated with data object 132, communication module 126 may send to node 110 a communication confirming receipt of the data associated with data object 132. Communication module 116 may receive from node 120 the communication confirming receipt of the data associated with data object 132, and access module 114 may then delete data object 132 based on receiving the confirmation.

After access module 114 in node 110 deletes data object 132, communication module 116 may send to node 120 a communication that indicates deletion of data object 132 by node 110. This communication may cause node 120 to own data object 132 and accordingly allow application 122 to access data object 132.

Figure 3:
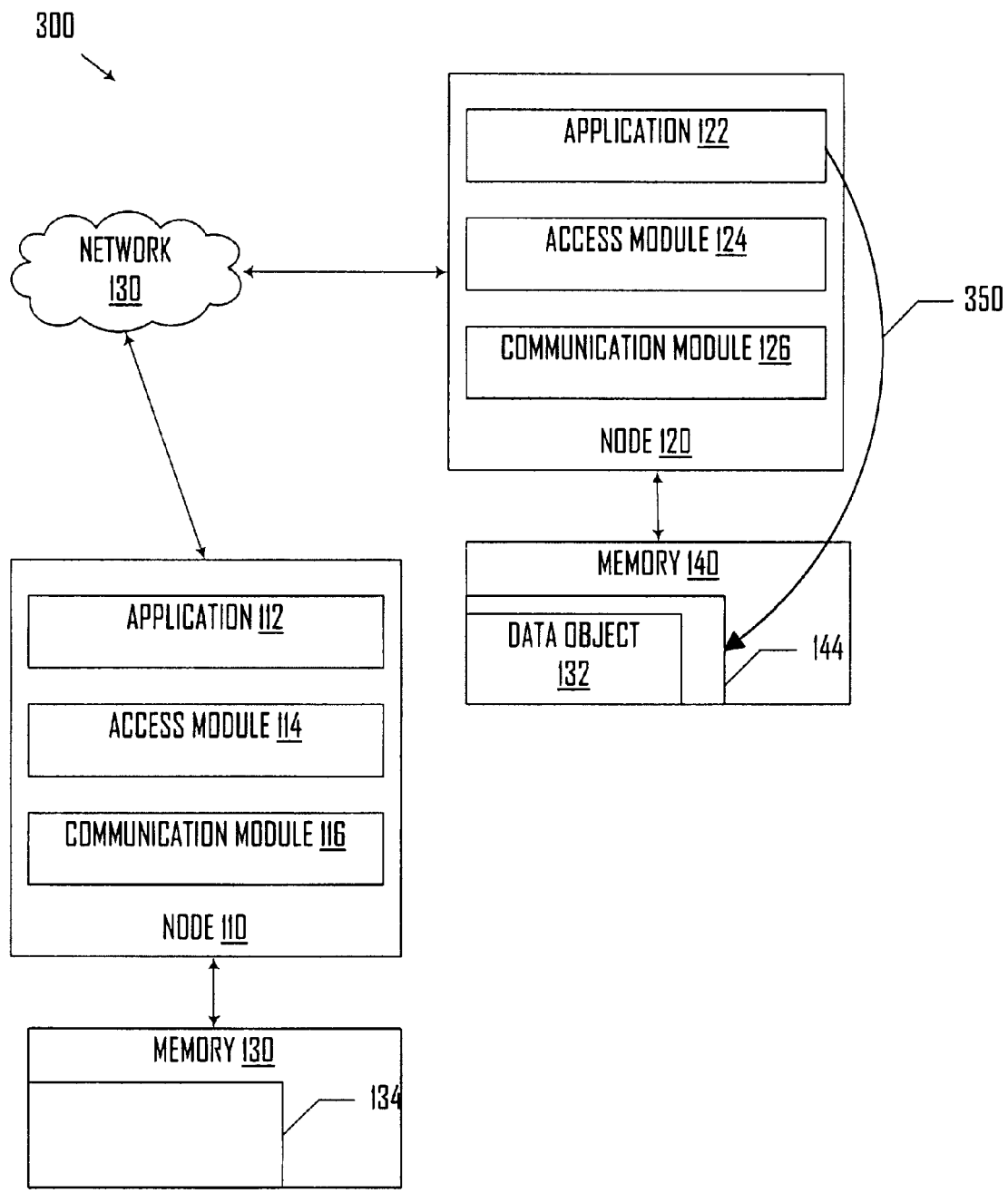
FIG. 3 is a simplified block diagram illustrating deletion of the data object from the first node, according to an embodiment.

FIG. 3 is a simplified block diagram 300 illustrating deletion of the data object from node 110, according to an embodiment.

In diagram 300, memory 130 coupled to node 110 no longer stores data object 132. Rather, memory 140 coupled to node 120 stores data object 132. Arrow 350 is illustrated to show that node 120 owns data object 132, and application 122 has access to data object 132. For example, application 122 may access data object 132 by reading or modifying the data object.

In an embodiment, application 122 accesses data object 132 without using a class library. In an example, access module 124 invokes an application programming interface (API) to directly access the data object. Access module 124 may via the API invoke methods and access properties of data object 132. Node 120 may provide internal APIs that allow application 122 to directly access the data object.

In FIG. 3, node 110 does not own data object 132, and accordingly application 112 does not have access to data object 132. Node 110 may resume ownership of data object 132 if node 120 transmits data object 132 to node 110 and deletes data object 132. Communication module 126 may transmit the data to node 110 for a variety of reasons. In an example, node 120 is a server, and node 110 is a client that sends a request to the server for data object 132. In another example, node 120 have requested data object 132 for a time period and agreed to return data object 132 to node 110 within the time period. In another example, communication module 126 may receive a remote method call from node 110 that causes communication module 126 to transmit the data associated with data object 132. Communication module 126 may invoke an API to transmit to node 110 the data associated with data object 132.

In an example, node 110 receives from node 120 the data associated with data object 132 and sends to node 120 a communication confirming receipt of the data associated with the data object. When node 110 receives the data associated with data object 132, node 120 may still own data object 132. Accordingly, node 110 may prevent application 112 running on node 110 from accessing the data object.

Node 120 may receive from node 110 the communication confirming receipt of the data associated with the data object. Node 120 may delete from node 120's memory the data object based on the confirmation. After node 120 deletes the data object, node 120 may send to node 110 a communication indicating deletion of data object 132 by node 120. Node 110 may then allow the application 112 running on node 110 to access the data object based on receiving the communication indicating deletion of data object 132 by node 120.

As discussed above and further emphasized here, FIGS. 1-3 are merely examples, which should not unduly limit the scope of the claims. In an example, although block diagram 100 is described herein with reference to two nodes that transfer between each other data associated with the data object, other embodiments including more than two nodes that transfer data associated with the data object are within the scope of this disclosure. For instance, node 110 may transfer data object 132 to node 120 or other nodes. In another example, although block diagram 100 is described herein with one application running on a node, other embodiments including more than one application running on a node are within the scope of this disclosure. For instance, node 110 and/or node 120 may run more than one application. Further, each of these applications may be able to access data object 132, although only one application may access data object 132 at a time.

Moreover, it should be understood that one or more modules (e.g., access module 114 and communication module 116) in FIGS. 1-3 may be combined with another module. In an example, access module 114 and communication module 116 are combined into one module. It should also be understood that one or more modules in FIGS. 1-3 (e.g., access module 114 and communication module 116) may be separated into more than one module. In an example, access module 114 is split into a first access module and a second access module.

IV. Example Methods

Figure 4:
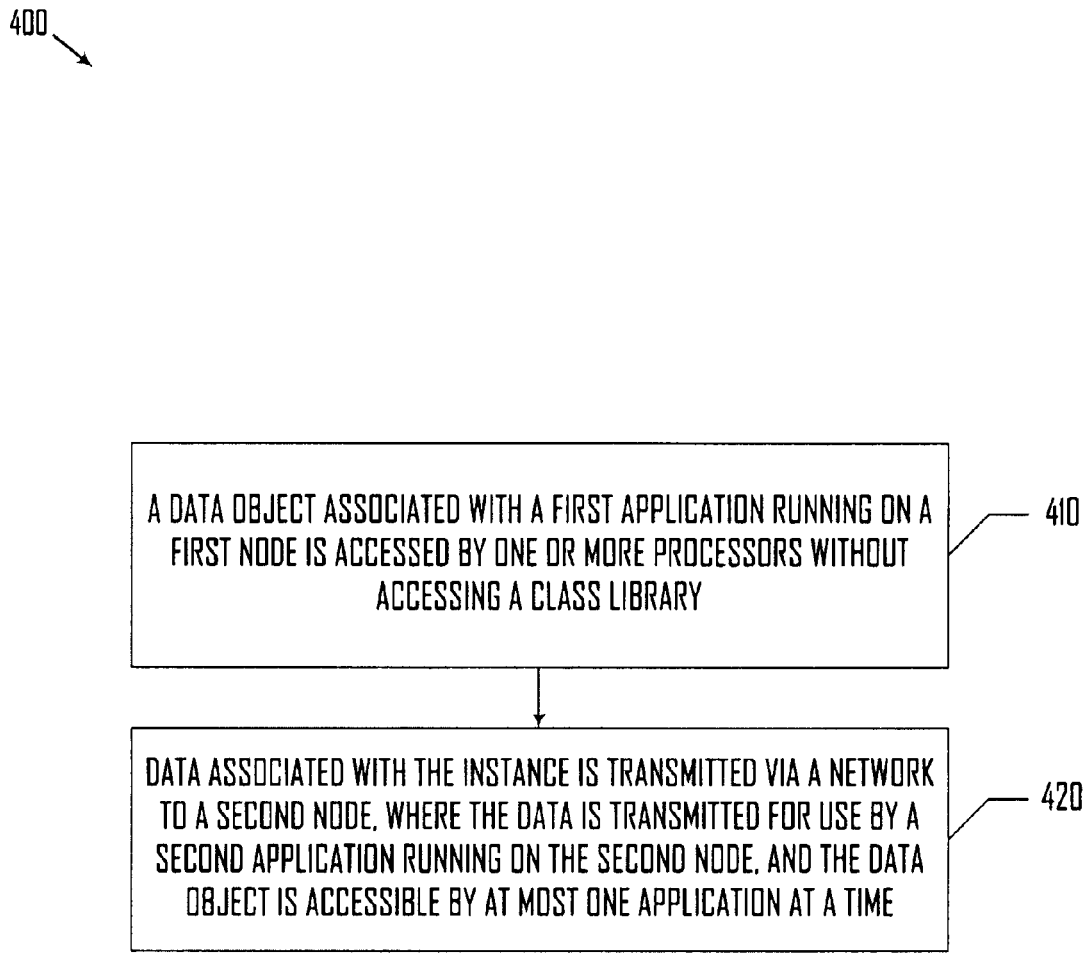
FIG. 4 is a simplified flowchart illustrating a method of transmitting data between applications, according to an embodiment.

FIG. 4 is a simplified flowchart illustrating a method 400 of transmitting data between applications, according to an embodiment. Method 400 is not meant to be limiting and may be used in other applications.

Method 400 includes steps 410-420. In a step 410, a data object associated with a first application running on a first node is accessed by one or more processors without accessing a class library. In an example, access module 114 accesses, by one or more processors, a data object associated with a first application running on a first node without accessing a class library. In an example, access module 114 invokes an application programming interface (API) to directly access the data object.

In a step 420, data associated with the instance is transmitted via a network to a second node, where the data is transmitted for use by a second application running on the second node, and the data object is accessible by at most one application at a time. In an example, communication module 116 transmits via a network to a second node, data associated with the instance, where the data is transmitted for use by a second application running on the second node, and the data object is accessible by at most one application at a time.

It is also understood that additional method steps may be performed before, during, or after steps 410-420 discussed above. It is also understood that one or more of the steps of method 400 described herein may be omitted, combined, or performed in a different sequence as desired.

V. Example Computing System

Figure 5:
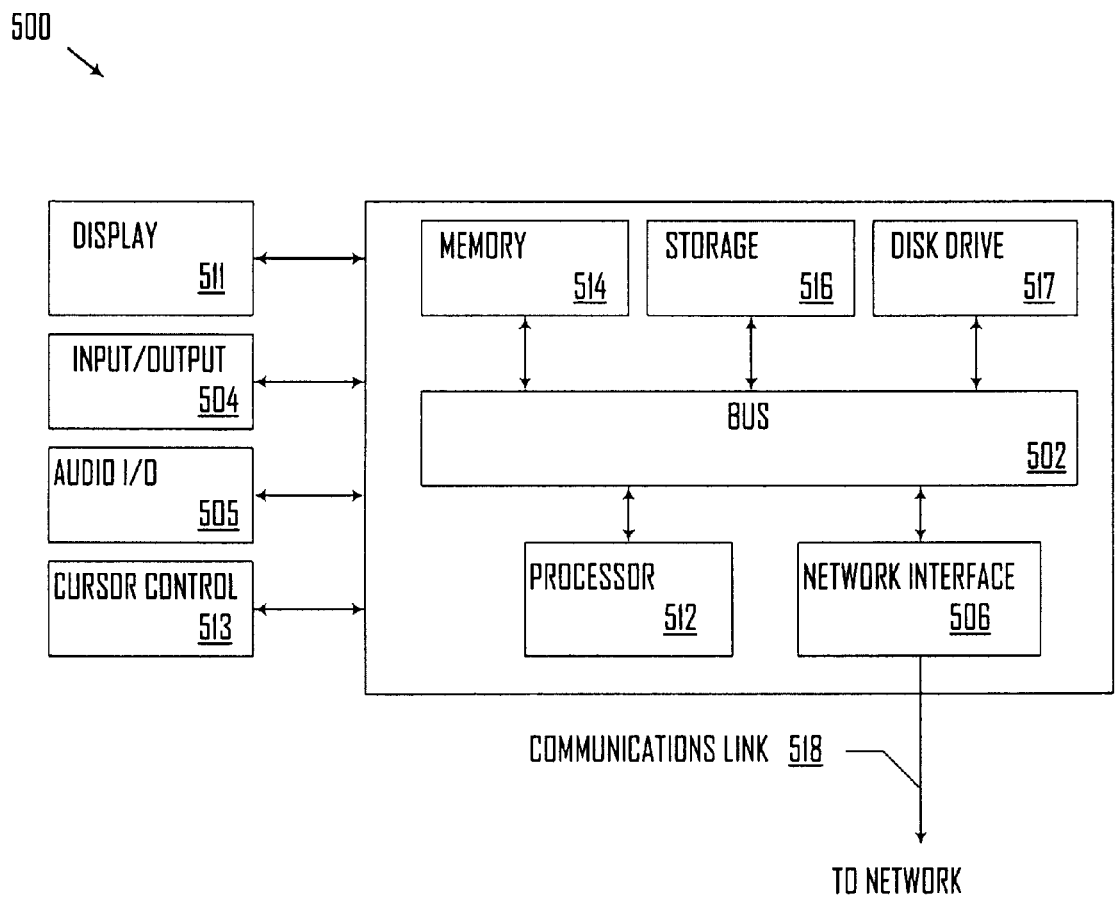
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, host machine 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for transmitting data between applications, the system comprising:
    a memory that stores a data object associated with a first application running on a first node;
    an access module that accesses the data object stored in the memory, wherein the access module accesses the data object without using a class library; and
    a communication module that transmits via a network to a second node, data associated with the data object,
    wherein the communication module transmits the data for use by a second application running on the second node, and after the communication module transmits the data associated with the data object to the second node, the data object is accessible by at most one application at a time.

2. The system of claim 1, wherein the first node includes a first virtual machine including the access module and communication module, and the second node includes a second virtual machine, and wherein the first virtual machine is executing on a first host machine, and the second virtual machine is executing on a second host machine.

3. The system of claim 1, wherein the access module invokes an application programming interface (API) to directly access the data object.

4. The system of claim 1, wherein the communication module receives from the second node a communication confirming receipt of the data associated with the data object, and the access module deletes the data object based on the confirmation.

5. The system of claim 4, wherein the second node receives the data associated with the data object and prevents the second application from accessing the data associated with the data object, and wherein after the access module deletes the data object the communication module sends to the second node a second communication to cause the second node to allow the second application to access the data object.

6. The system of claim 5, wherein the second communication indicates deletion of the data object by the first node.

7. The system of claim 4, wherein when the communication confirming receipt of the data has not been received after a time period has elapsed, the communication module retransmits via the network to the second node the data associated with the data object.

8. The system of claim 4, wherein after the access module deletes the data object, the communication module receives via the network from the second node, second data associated with the data object, and the access module prevents the first application from accessing the data object.

9. The system of claim 8, wherein the communication module receives a third communication indicating deletion of the data object by the second node, and the access module allows the first application to access the data object based on the third communication.

10. The system of claim 2, wherein the data object is instantiated by the first node.

11. The system of claim 1, wherein the communication module receives a remote method call from the second node.

12. The system of claim 1, wherein the data associated with the data object includes one or more properties and one or more methods of the data object.

13. A method of transmitting data between applications, the method comprising:
    accessing a data object stored in a computer memory, the data object being associated with a first application running on a first node, wherein the data object is accessed without using a class library; and
    transmitting via a network to a second node, data associated with the data object, wherein the data is transmitted for use by a second application running on the second node, and after the data associated with the data object is transmitted to the second node the data object is accessible by at most one application at a time.

14. The method of claim 13, wherein the accessing includes accessing, via a first virtual machine, the data object, and the transmitting over a network includes transmitting over the network to a second virtual machine, data associated with the data object, and wherein the first virtual machine is executing on a first host machine, and the second virtual machine is executing on a second host machine.

15. The method of claim 13, wherein the accessing a data object includes invoking an application programming interface (API) to directly access the data object.

16. The method of claim 13, further comprising:
    receiving from the second node a communication confirming receipt of the data associated with the data object; and
    deleting the data object based on the confirmation.

17. The method of claim 16, wherein the second node receives the data associated with the data object and prevents the second application from accessing the data associated with the data object, the method further comprising:
    after the deleting the data object, sending to the second node a second communication to cause the second node to allow the second application to access the data object.

18. The method of claim 17, wherein the sending to the second node a second communication includes sending to the second node virtual machine a second communication indicating deletion of the data object by the first node.

19. The method of claim 13, wherein the transmitting includes transmitting one or more properties and one or more methods of the data object.

20. A non-transitory machine-readable medium comprising a plurality of machine-readable instructions that when executed by one or more processors is adapted to cause the one or more processors to perform a method comprising:
    accessing an instance of a data object associated with a first application running on a first node, wherein the accessing includes accessing the data object instance without accessing a class library; and
    transmitting over a network to a second node data associated with the data object instance, the data being transmitted for use by a second application running on the second node, and after the data associated with the data object is transmitted to the second node the data object instance is accessible by at most one application at a time.

* * * * *